United States Patent [19]
Gorkovenko et al.

[11] 3,867,098
[45] Feb. 18, 1975

[54] GAS ANALYZER DETECTOR

[76] Inventors: Boris Konstantinovich Gorkovenko, Peremyshelsky, Pereulok, 6, kv. 15; Alexandr Mikhailovich Mikhailovsky, Peremyshelsky, pereulok, 6, kv. 16; Valentina Dmitrievna Churilova, ulitsa Gogolevskaya, 43a, kv. 34; Olga Georgievna Kirillova, ulitsa Saxagonskogo, 15, kv. 16, all of Kiev, U.S.S.R.

[22] Filed: Apr. 11, 1973

[21] Appl. No.: 350,159

[52] U.S. Cl. .......... 23/254 E, 23/255 E, 23/253 PC
[51] Int. Cl.. G01n 25/20, G01n 31/12, G01n 27/16
[58] Field of Search ....... 23/230 PC:253 PC, 232 E, 23/254 E, 255 E; 324/71 R

[56] References Cited
UNITED STATES PATENTS
3,595,621  7/1971  Andreatch........................ 23/254 E

*Primary Examiner*—R. E. Serwin
*Attorney, Agent, or Firm*—Waters, Roditi, Schwartz & Nissen

[57] ABSTRACT

A gas analyzer detector comprising a sorption chamber widening in the direction of the flow of a gas mixture fed to the inlet thereof. A heating coil filled with a sorbent, is arranged close to the wall of the sorption chamber, covering almost all of its length. Upon leaving the sorption chamber, the gas mixture flows around a thermal element whereon combustible components of the gas mixture being analyzed are burnt.

1 Claim, 1 Drawing Figure

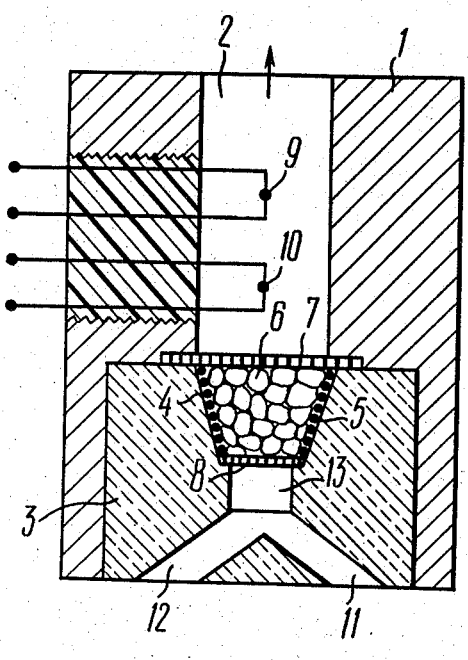

GAS ANALYZER DETECTOR

The present invention relates to devices for detecting combustible components in gas mixtures and more particularly to a gas analyzer detector or pick-up.

Well known in the art is a gas analyzer detector comprising one chamber containing a thermal element and an element which is neutral with respect to the combustible components of the gas mixture subject to analysis, both elements being connected to a circuit for measuring the concentration of combustible components in a gas mixture.

Such a pick-up does not allow for establishing the content of combustible components in the case of a low concentration thereof in a gas mixture.

Also known in the art is a gas analyzer pick-up for detecting low concentrations of combustible components, comprising two chambers with thermal elements connected to a circuit for measuring the concentration of combustible components in a gas mixture, as well as a sorption chamber with a heating coil inside, made on the form of a cup filled with granules of a sorbent.

The desorption of combustible components from the sorbent is effected thermally, after switching on the heating coil.

A disadvantage of such a pick-up is that the sorption chamber is bigger than the heating coil cup, which enables the gas mixture to pass freely through the loops of the heating coil and thus accounts for an incomplete adsorption of combustible components by the sorbent. Besides, desorbed combustible components are accumulated on the walls of the sorption chamber.

All this impairs the sensitivity of the apparatus and the accuracy of the analysis.

Another disadvantage of the above pick-up lies in the fact that the heating coil is shaped like a cup; as a result, the combustible components desorbed from the granules of the sorbent in the lower portion of the cup are burnt before they can leave the cup, which reduces the sorption effect and, consequently, the sensitivity of the apparatus.

It is an object of the present invention to eliminate said disadvantages.

The basic object of the invention is to provide a gas analyzer pick-up with a high sensitivity, accuracy of the analysis and production effectiveness.

With these and other objects in view, the essence of the present invention is as follows: a gas mixture subject to analysis is fed to the inlet of a sorption chamber containing a heating coil filled with a sorbent; upon leaving the sorption chamber, the gas mixture flows around a thermal element whereon the combustible components of the gas mixture are burnt, the thermal element being connected to a circuit for measuring the concentration of combustible components in a gas mixture; according to the invention, the sorption chamber widens in the direction of the gas mixture flow, while the heating coil is placed in immediate proximity to the wall of the chamber, covering almost all of its length.

Further objects and advantages of the present invention will become apparent to those skilled in the art from the following description of examples of an embodiment thereof and the accompanying drawing showing a general view of the gas analyzer pick-up, according to the invention.

A casing 1 (FIG. 1) of the gas analyzer pick-up has a reaction chamber 2 and a removable container 3 made of a heat-resistant material, with a sorption chamber 4 placed in the upper part thereof, the outlet of the sorption chamber being connected to the inlet of the reaction chamber 2. The sorption chamber 4 widens in the direction of the flow of the gas mixture fed to its inlet. The most rational shape of the sorption chamber 4 is that of a truncated cone; it is expedient that the angle of slope of the generatrix of the cone be greater than 30°.

Placed in immediate proximity to the wall of the sorption chamber 4, covering almost all of its length, is a heating coil 5. It is recommended that the heating coil 5 be wound uniformly, loop to loop. The coil 5 is filled with a sorbent 6, for example, with alumina, which is held by wire nets 7 and 8. The heating coil 5 ensures the warming-up of the sorbent 6 during the desorption process.

The reaction chamber 2 comprises pair of thermal elements 9, 10. The first of these elements is catalytic, wherein combustible components are burnt and the second of these elements is non-catalytic. Both are connected to a circuit for measuring the concentration of combustible components in a gas mixture. These elements are made of platinum wire with a solid carrier, for example, of alumina, the solid carried of the thermal element 9 being coated with a layer of a catalytically active substance, for example, a mixture carrier platinum and palladium.

The removable container 3 has an inlet channel 11 for the admission of a tested gas mixture and an inlet channel 12 for purging the sorption chamber 4 and the reaction chamber 2 of bottom products of the analysis. The inlet channels 11 and 12 combine into a channel 13 arranged at the inlet of the sorption chamber 4, the diameter thereof being equal to the internal diameter of a loop of the heating coil 5.

The proposed gas analyzer pick-up used for measuring low concentrations of combustible components in a gas mixture, operates as follows.

A dose of a gas mixture to be analyzed is fed through the inlet hole 11 into the channel 13 and further on, to the sorption chamber 4 wherein the combustible components are adsorbed on the sorbent 6.

Freed from the combustible components, the gas mixture passes through the reaction chamber and is released into the atmosphere.

Upon switching on the heating coil 5, the combustible components of the gas mixture, which have been adsorbed on the sorbent, are desorbed thereform. The less the diameter of the loops of the heating coil 5, the faster they are heated; this applies to the loops placed at the inlet of the sorption chamber 4; as a result, the combustible components are first desorbed from the granules of the sorbent 6 in the lower section of the sorption chamber 4. Further heating of the coil 5 gradually shifts the desorption process to the upper granules of the sorbent 6. As this takes place, the combustible components are transferred convectively to the reaction chamber 2; this is effected before the upper loops of the heating coil 5 are heated to a temperature at which the combustible components of the gas mixture are burnt. Thus, the proposed device makes for a fuller utilization of the flow of the desorbed combustible components. The latter are transferred convectively to the reaction chamber 2 wherein they are burnt on the thermal element 9 which gives a signal proportional to the quantity of the burnt combustible components; the signal is registered by the circuit for measuring the concentration of combustible components in the gas mixture being analyzed.

Thermal element 10 connected in the measuring circuit so that compensate changes in resistance of the thermal element 9 not caused by the heat of the catalytic oxidation of combustible components. The sorption chamber 4 which widens in the direction of the gas mixture flow, and the heating coil 5 arranged in immediate proximity to the wall of the sorption chamber 4 make for a free and complete enveloping of the sorbent 6 by the gas flow, which results in a fuller adsorption and desorption of the combustible components.

After the analysis is over, air is fed through the inlet channel 12 to rid the sorption chamber 4 and the reaction chamber 2 of bottom products.

The proposed gas analyzer pick-up makes for a higher accuracy and sensitivity of measurements, as compared to the conventional devices, which makes it possible to carry out analyses for the concentration of combustible components in a gas mixture, whose content may be as low as $10^{-4}$ percent by volume.

What is claimed is:

1. A gas analyzer detector comprising a sorption chamber widening in the direction of the flow of a gas mixture to be analyzed fed to the inlet thereof; a heating coil arranged in immediate proximity to the wall of said sorption chamber, covering almost all of its length; a sorbent which fills said sorption chamber; a reaction chamber placed at the outlet of said sorption chamber; a pair of thermal elements, the first of said elements being catalytic, whereon combustible components are burnt, and the second of said elements being non-catalytic with respect to combustible components of the gas mixture to be analyzed and so connected in the measuring circuit to compensate for changes in resistance in said first element not caused by the heat of the catalytic oxidation of combustible components, both elements being placed in said reaction chamber and connected to a circuit for measuring the concentration of combustible components in the gas mixture being analyzed.

* * * * *